United States Patent
Smith et al.

(10) Patent No.: US 7,168,147 B2
(45) Date of Patent: Jan. 30, 2007

(54) METHOD FOR MANUFACTURING A DRILLING TOOL WITH AN ELASTOMER SEAL HAVING GRADED PROPERTIES

(75) Inventors: Redd H. Smith, The Woodlands, TX (US); Terry J. Koltermann, The Woodlands, TX (US); Jiri George Drobny, Merrimack, NH (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/177,388

(22) Filed: Jul. 8, 2005

(65) Prior Publication Data
US 2006/0005370 A1    Jan. 12, 2006

Related U.S. Application Data

(60) Provisional application No. 60/586,785, filed on Jul. 9, 2004.

(51) Int. Cl.
*B23P 11/02* (2006.01)
*F16J 15/00* (2006.01)

(52) U.S. Cl. .................. 29/451; 29/527.1; 277/500; 277/540; 277/627; 277/650

(58) Field of Classification Search ............ 29/451, 29/527.1; 277/500, 177, 165, 227, 650, 534, 277/540, 627
See application file for complete search history.

(56) References Cited

U.S. PATENT DOCUMENTS 3,788,654 A    1/1974    Mandley 5,362,073 A * 11/1994 Upton et al. ............... 277/589
5,456,327 A * 10/1995 Denton et al. .............. 175/371
5,842,701 A * 12/1998 Cawthorne et al. ......... 277/336
6,026,917 A *  2/2000 Zahradnik et al. .......... 175/371
6,142,249 A * 11/2000 Zahradnik et al. .......... 175/371
6,684,966 B2 * 2/2004 Lin et al. ................... 175/372

OTHER PUBLICATIONS

Jiri George Drobny, Radiation Technology for Polymers, Published Nov. 25, 2002, CRC Press, pp. 1-4, 27-29, 63-70, 77-80.*
*Radiation Technology for Polymers*, by Jiri George Drobny, CRC Press, pp. 1-4, 27-29, 63-70, 77-80.

* cited by examiner

*Primary Examiner*—David P. Bryant
*Assistant Examiner*—Christopher M. Koehler
(74) *Attorney, Agent, or Firm*—Bracewell & Giuliani LLP

(57) ABSTRACT

A method of forming a seal for a subterranean drilling tool employs irradiation. The seal is formed of a single homogeneous elastomeric material. The seal has an exterior surface with at least one portion that is in sliding engagement with part of a seal gland of the drilling tool. A property gradient is formed in the elastomeric material on at least this portion. The property gradient is formed by exposing the seal to an environment to define a property that changes from a first level to a second level without essentially changing the composition of the elastomeric material. The step of exposing is done by irradiating the seal with an electron beam.

18 Claims, 3 Drawing Sheets ved the seal of FIG. 1,
shown removed from the bit.
FIG. 3 is a further enlarged sectional view of a portion of
the seal of FIG. 1, shown installed within the bit.
FIG. 4 is a graph illustrating for the seal of FIG. 2 the
hardness versus the depth from the dynamic surface of the
seal.
FIG. 5 is a sectional view of an alternate embodiment of
a seal for an earth-boring bit of FIG. 1.

METHOD FOR MANUFACTURING A DRILLING TOOL WITH AN ELASTOMER SEAL HAVING GRADED PROPERTIES

CROSS-REFERENCE TO RELATED APPLICATION

This application claims priority to provisional application 60/586,785 filed Jul. 9, 2004.

FIELD OF THE INVENTION

This invention relates in general to manufacturing a seal for an earth-boring bit that has a property gradient portion formed on at least a portion of the seal.

BACKGROUND OF THE INVENTION

One type of earth boring bit has a bit body with three rotatable cones. Each cone has cutting implements for disintegrating earth formations. The cones are mounted on bearing pins that depend from the bit body. A lubricant cavity within the bit body supplies lubricant to the bearing spaces between the cones and bearing pins. A seal or seal assembly is located at the mouth of the cone to prevent loss of the lubricant.

One type of seal is an elastomeric annular member having an inner diameter and an outer diameter. The cross-sectional configuration is rounded, such as circular or elliptical. One of the diameter portions forms a dynamic seal. The dynamic seal portion is in sliding engagement and normally the other side of diameter portion forms a static seal. Sometimes both diameter portions encounter dynamic sealing engagement. The sliding engagement generates heat due to friction, thus causing wear over time.

Some drill bit seals are formed of a single homogeneous elastomeric material. The hardness of the elastomeric material is uniform throughout, including at both the inner and outer diameter portions. Another type of drill bit seal is formed of two or more different types of elastomer that are co-cured. One type has a greater hardness than the other type for serving as the dynamic seal portion. The softer portion provides the desired amount of force due to the squeeze on the seal when installed. It has also been proposed to plasma treat the surface of the seal with an inert gas containing a reactive gas species such as chlorine or fluorine. This treatment provides a chlorinated or fluorinated molecules at the surface. Various other techniques to change the surface of an earth boring bit seal are disclosed in the patented art.

SUMMARY OF THE INVENTION

In the method of this invention, a property gradient is formed in at least a portion of the elastomeric material. Preferably, the property gradient is formed by exposing the seal to an environment to create gradual change in at least one property of the elastomeric material, such as hardness, elastic modulus or bulk modulus. In one embodiment, an electron beam is used to irradiate the seal, increasing cross-linking of the polymer chains within the property gradient. The elastomeric material within the property gradient is essentially chemically the same as the remaining portion of the seal. Preferably, one property comprises a decreasing hardness in the gradient from the exterior surface for a selected depth. A portion of the exterior surface may be free of any property gradient.

DETAILED DESCRIPTION OF THE INVENTION

Figure 1:
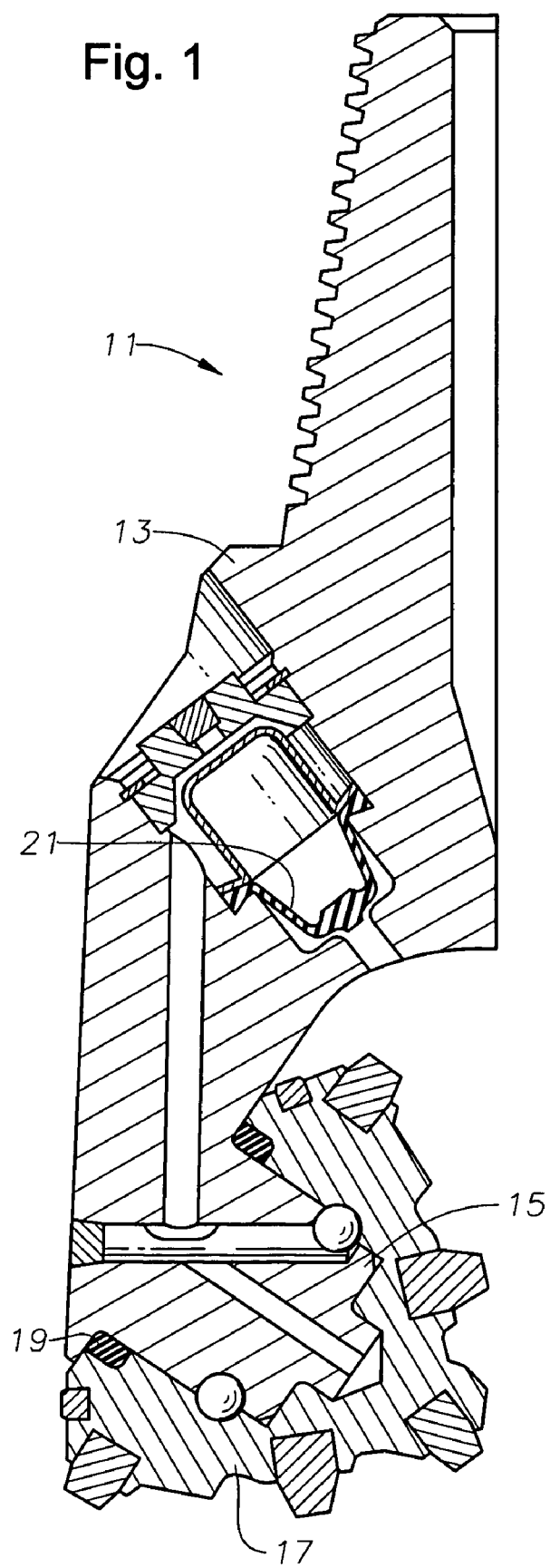
FIG. 1 is a sectional view of an earth-boring bit having a seal constructed in accordance with this invention.

Referring to FIG. 1, drill bit 11 has a bit body with at least one bit leg 13, and typically three legs. Each bit leg 13 has a depending bearing pin 15. A cone 17 rotatably mounts over each bearing pin 15. A seal 19 seals lubricant within a cavity of cone 17 surrounding bearing pin 15. A compensator 21 is in communication with the lubricant for equalizing the pressure of the lubricant with the drilling fluid hydrostatic pressure on the exterior of drill bit 11. Drill bit 11 could also be a type utilized with compressed air as the drilling fluid.

Figure 2:
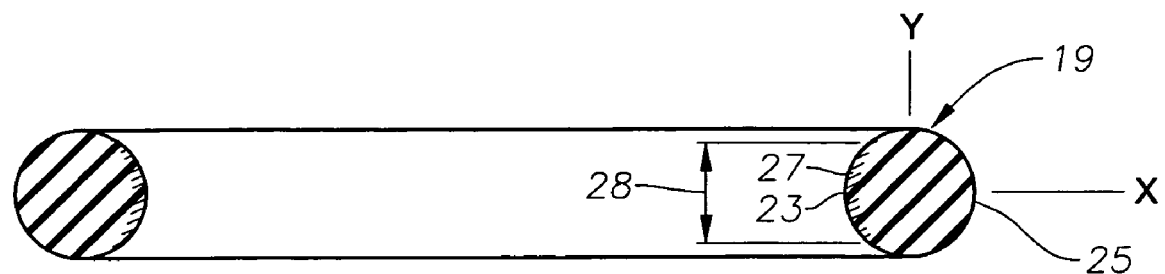
FIG. 2 is an enlarged sectional view of the seal of FIG. 1, shown removed from the bit.

Referring to FIG. 2, seal 19 in this embodiment is an O-ring having a circular transverse cross-section. Seal 19 has an inner diameter 23 that engages bearing pin 15 in a dynamic sliding contact as cone 17 rotates. Seal 19 has an outer diameter 25 that typically statically engages the cavity in cone 17. Seal 19 in this embodiment thus typically rotates with cone 17. Seal 19 is preferably formed as a single piece member of a single homogeneous polymer material, such as the following: nitrile butadiene rubber (NBR); hydrogenated nitrile butadiene rubber (HNBR); carboxylated nitrile butadiene rubber (XNBR); or hydrogenated carboxylated nitrile butadiene rubber (XHNBR). The material of seal 19 may also contain reinforcing materials, such as carbon black, silica or fibers.

Figure 4:
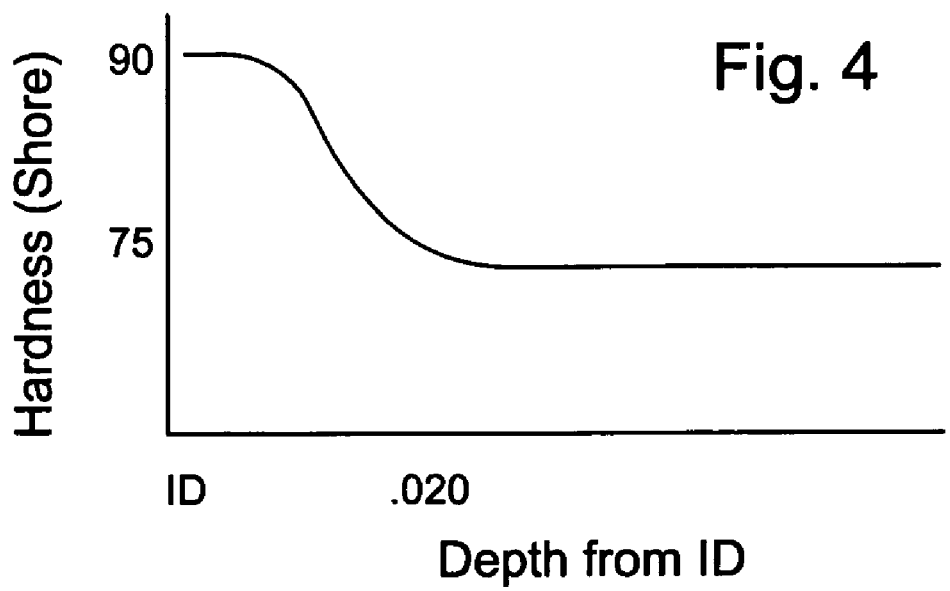
FIG. 4 is a graph illustrating for the seal of FIG. 2 the hardness versus the depth from the dynamic surface of the seal.

Although a single homogenous material, at least one property of at least a portion of seal 19 differs from the exterior surface of seal 19 to its interior. A property gradient 27 extends inward a selected distance from the exterior of seal 19. By way of example, property gradient 27 is shown in FIG. 4 extending inward from inner diameter region 23, however it could be alternately or also located on outer diameter region 25 or the entire exterior surface. Property gradient 27 has at least one property that changes from a first level, at the surface of seal 19, to a second level within the interior of seal 19. The property may be hardness, elastic modulus, bulk modulus, toughness, abrasion resistance, friction coefficient, strength and other characteristics. For example, property gradient 27 is harder at the surface of inner diameter region 23 and reduces in hardness in a direction toward the interior of seal 19.

Property gradient 27 has a depth along an X-axis, which is a thickness of seal 19 from inner diameter 23 to outer diameter 25, which is considerably less than about one-half the total distance from inner diameter 23 to outer diameter 25. In the preferred embodiment, the depth of property gradient 27 in the X-direction is less than about $\frac{1}{10}^{th}$ the transverse cross-sectional diameter of seal 19 along the X-axis. The depth of property gradient 27 in the X-direction is greater than about one percent of the transverse cross-sectional diameter of seal 19 along the X-axis. For example, for a seal having a transverse cross-sectional diameter along the X-axis of 0.250", the depth of property gradient 27 is preferably only about 0.010–0.040".

Figure 3:
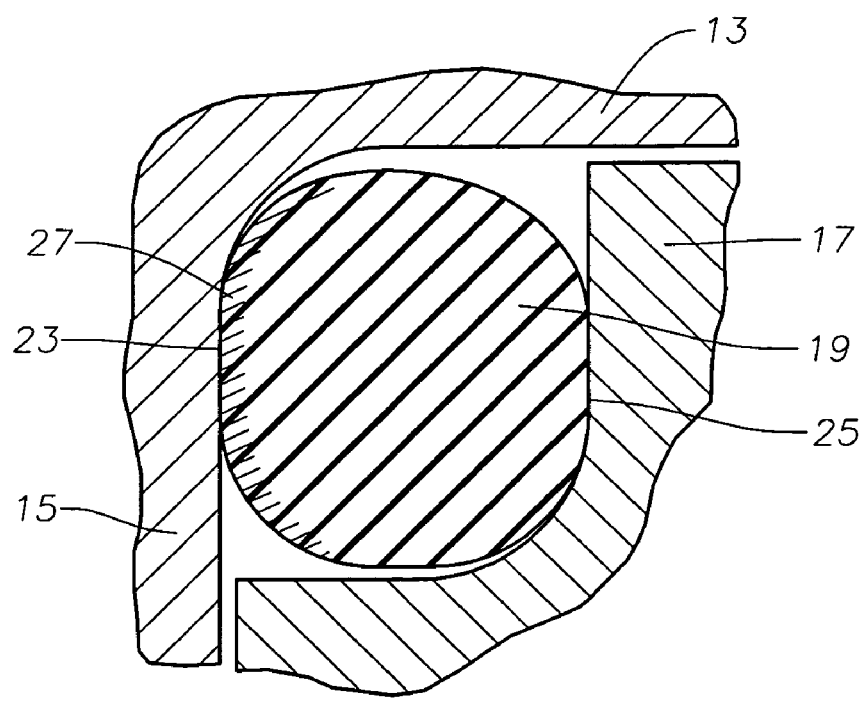
FIG. 3 is a further enlarged sectional view of a portion of the seal of FIG. 1, shown installed within the bit.

The Y-dimension 28 of property gradient 27 along the Y-axis, which is perpendicular to the X-axis, may be less than the total cross-sectional dimension of seal 19 along the Y-axis. For a circular cross-section, as shown, the cross-sectional dimension of seal 19 in the above example is 0.250". The Y-dimension 28 of property gradient 27 in its natural state (FIG. 2) prior to installation should be sufficient to present the property gradient 27 of seal 19 to bearing pin 15 when installed. FIG. 3 shows seal 19 installed under a typical operational squeeze along the X-axis. Squeezing seal 19 along the X-axis increases the surface contact between inner diameter 23 and bearing pin 15. The bulk of seal 19 will remain at a different property value than the property values in property gradient 27, as indicated in FIG. 4 for hardness. The surface area of property gradient 27 is less than the remaining portion of the exterior surface of seal 19 in this example.

In one embodiment, property gradient 27 has a hardness measured in terms of IRHD (International Rubber Hardness Degrees) utilizing a micro-hardness tester. The first level, at the exterior surface of seal 19 is preferably at least about 10 percent greater than the second level in property gradient 27, which is the average value within the interior of seal 19. In one example, the IRHD is in the range from 85 to 90 at the surface and 75 in the interior. These values correspond generally to Shore A hardness values. Conventional measuring instruments for measuring Shore A will not accurately resolve the difference in hardness within property gradient 27.

Property gradient 27, if in rotary sliding contact, wears less due to its properties than if inner diameter region 23 were of the same properties as the interior of seal 19. One additional advantage of retaining the majority of seal 19 at a lower compressive modulus than that in property gradient 27 is that the force developed by the seal when compressed along the X-axis to its compressed position is less than if the seal were of a uniform higher stiffness. The lower compressive modulus in the majority of seal 19 thus results in reduced contact stress and consequently friction at the seal dynamic interface.

Figure 5:
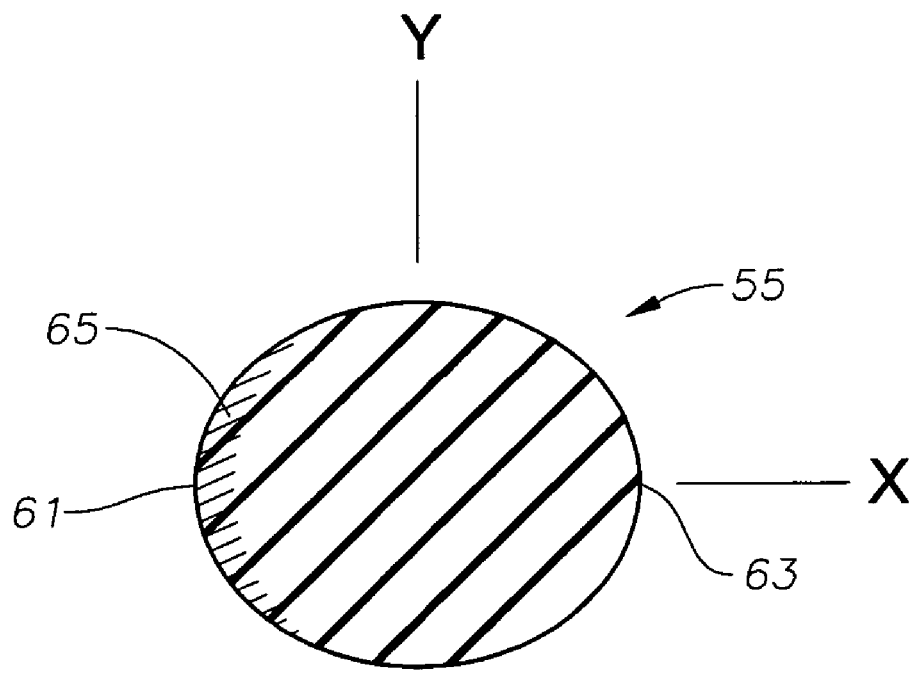
FIG. 5 is a sectional view of an alternate embodiment of a seal for an earth-boring bit of FIG. 1.

Seal 19 could be of different shapes. For example, FIG. 5 shows a seal 55 that in its natural configuration is elliptical. Seal 55 has a greater cross-sectional thickness along its X-dimension than its Y-dimension, creating a major axis along in the X-direction and a minor axis in the Y-direction. Seal 55 has an inner diameter 61 and an outer diameter 63. Property gradient 65 is shown located on the inner diameter region 61 in this embodiment, but could be on the outer diameter region 63 or the entire exterior surface.

There are a number of ways to achieve the desired property gradient 27. In one method, seal 19 (or seal 55) is molded conventionally to form a rubber compound with generally uniform properties throughout. During the conventional molding process, which utilizes pressure and temperature, cross links are formed between the polymer chains. The cross linking occurring in the conventional process is self-limiting and utilizes a cross-linking agent, such as an organic peroxide. The cross-linking stops when the cross-linking agent is consumed. Typically, a co-agent is employed along with the cross-linking agent.

Subsequently, seal 19 is treated to create property gradient portion 27 without changing the essential chemical composition of the material of seal 19. In one technique, an electron beam process is employed to generate property gradient portion 27. Seal 19 is placed in a chamber within an inert atmosphere, such as nitrogen. A focused electron beam is directed through a window into the chamber, striking at least a portion of the exterior surface of seal 19. If seal gradient 27 is to be only on a fractional portion of seal 19, a shield will be employed to mask the electron beam from the remaining portion. The depth of property gradient 27 is controlled by the accelerating voltage of the electron beam. The radiation dosage varies the properties within property gradient 27. The radiation dosage is controlled by the time of exposure. In one embodiment, the electron beam has an accelerating voltage in the range from 70 kV to 250 kV. The radiation dose delivered by the electron beam is in the range from 10 kGy to 300 kGy. During the electron beam process, additional cross-linking of the polymer chains occurs to create property gradient 27.

In a second method, a radiation cross-link promoter (prorad) is utilized to enhance the further cross-linking. The prorad is included into the polymeric formulation prior to molding. The prorad survives the molding process and may serve to facilitate the cross-linking of the elastomer during the electron beam irradiation process. Suitable prorads are commercially available for electron beam curing of polymers. The following lists the prorad by chemical name and in some instances, by trademark and manufacturer:

diallyl maleate,
triallyl cyanurate (TAC)
triallyl isocyanurate (TAIC)
n,n'-(m-phenylene bismaleimide (HVA-2)
polyacrylates and polymethacrylates
trifunctional acrylate, e.g. Saret SR.519
trifunctional methacrylate, e.g. Saret SR-517
pentacrythritol tetraacrylate, e.g. Saret SR-295
dipentaerythritol pentaacrylate, e.g. Saret SR-399
trimethylolpropane trimethacrylate, e.g. Saret SR-350
liquid butadienes with 1,2-vinyl content 45% or higher (e.g. Ricon 100, Ricon 153, Ricon 154, Krasvl LB 2000, Krasvl LB 3000, Lithene AH, Lithene AX)
Methacrylated polybutadiene (e.g. Ricacryl 3100)
Saret, Ricon and Ricacryl are trademarks of Sartomer Company, Inc.
Krasvl LB is a trademark of Kancrik A.S.
Lithene is a trademark of Synthomer Ltd.

The elastomeric formulation may contain any of the above prorads alone or as a combination of two or more. The amount of prorad to be added to the elastomeric formulation is about 2 to 20 phr (parts per hundred parts of rubber). In some cases, the co-agent used during the conventional molding process can also function as a prorad during radiation cross-linking.

In some applications, the outer diameter region of a seal may be in dynamic, sliding engagement while the inner diameter region is in static engagement. In those cases, the property gradient may be only on the outer diameter region, if desired. In other cases, the inner and outer diameter regions could be alternatively in sliding contact, in which case, both the inner diameter and the outer diameter regions would have a property gradient. Another embodiment would be for a property gradient to exist completely around the surface of the seal such that any seal surface in sliding contact would have the property gradient.

Another embodiment would allow for the formation of a property gradient in non-axisymmetric areas of the seal. Such areas could comprise selected regions on a sector or multiple discontinuous regions or sectors of the seal.

In addition to seals for drill bits, seals for other subterranean applications are feasible, particularly for downhole well and mining tools. In addition to the materials for seal 19 mentioned above, other suitable materials for seals for downhole well tools include fluorocarbon elastomers, perfluorocarbon elastomers, and fluorocarbon/propylene copolymer elastomers.

The invention has significant advantages. The method provides a property gradient in desired areas without changing the chemical composition of the seal. The properties on the exterior provide better wear resistance for dynamic engagement. The different properties in the interior or bulk portion of the seal avoid excessive force being generated due to deformation when installed.

While the invention has been described in only a few of its forms, it should be apparent to those skilled in the art that it is not so limited but is susceptible to various changes without departing from the scope of the invention. For example, the method of forming the property gradient may be by gamma ray or x-ray processes.

The invention claimed is:

1. A method of sealing between a rotating and a static component of a subterranean drilling tool, comprising:
   (a) molding an annular seal having an inner diameter surface and an outer diameter surface and being from an elastomeric material of generally uniform composition and curing the seal to provide a property that is at a substantially uniform selected level throughout the seal; then
   (b) exposing the seal to an environment to form a property gradient on at least one of the surfaces of the seal wherein the property changes progressively from a surface level at said one of the surfaces to the selected level without essentially changing the composition of the elastomeric material;
   (c) forming a seal gland between the rotating component and the static components of the tool; and
   (d) placing the seal in the seal gland with one of the surfaces in contact with the rotating component and the other surface in contact with the static component.

2. The method according to claim 1, wherein step (b) comprises irradiating said at least one of surfaces of the seal.

3. The method according to claim 1, wherein the curing in step (a) comprises cross-linking the elastomeric material of the seal.

4. The method according to claim 3, wherein step (b) comprises utilizing radiation energy to further increase a density of the cross-linking within the gradient formed on the seal.

5. The method according to claim 1, wherein:
   step (a) further comprises including a radiation cross-linking promoter in the elastomeric material prior to the curing; and
   step (b) comprises directing an electron beam against said at least one of the surfaces of the seal.

6. The method according to claim 1, wherein the property of step (b) comprises a selected one of the group consisting of hardness, elastic modulus, and bulk modulus.

7. The method according to claim 1, wherein step (b) comprises controlling the exposure to the environment to create a depth for the property gradient that is less than about one-half of a cross-sectional thickness of the seal between the inner diameter surface and the outer diameter surface.

8. The method according to claim 1, wherein step (b) comprises controlling the exposure to the environment to create a depth for the property gradient that is at least about 10 percent of a cross-sectional thickness of the seal between the inner diameter surface and the outer diameter surface.

9. The method according to claim 1, wherein step (b) comprises controlling the exposure to the environment to create a depth for the property gradient that is at least about one percent of a cross-sectional thickness of the seal between the inner diameter surface and the outer diameter surface.

10. The method according to claim 1, wherein the property of step (b) comprises an IRHD (International Rubber Hardness Degree) value, and the surface level differs from the selected level by approximately at least ten percent.

11. A method of of sealing between rotating and static components of a subterranean drilling tool, comprising:
    (a) molding an annular seal having an inner diameter surface and an outer diameter surface from a polymeric material of generally uniform composition and curing the seal with a peroxide to create a generally uniform selected hardness throughout the seal; then
    (b) exposing at least one of the surfaces of the seal to a radiation source to form a hardness gradient on at least one of the surfaces of the seal wherein the hardness progressively decreases from said one of the surfaces to the selected hardness;
    (c) forming a seal gland between the rotating and the static components of the tool; and
    (d) placing the seal in the seal gland with one of the surfaces in sealing contact with the rotating component and the other surface in sealing contact with the static component.

12. The method according to claim 11, wherein the radiation source of step (b) comprises an electron beam.

13. The method according to claim 12, wherein the electron beam has an accelerating voltage in the range from 70 kV to 250 kV.

14. The method according to claim 11, wherein step (b) comprises applying an electron beam dose in the range from 10 kGy to 300 kGy.

15. The method according to claim 11, wherein:
    step (a) further comprises including a radiation cross-linking promoter in the polymer material.

16. The method according to claim 11, wherein:
    step (a) comprises including cross-linking co-agents in the polymer material prior to molding the seal to cause an initial cross-linking of the polymer material during the molding and the curing.

17. The method according to claim 16, wherein a portion of the cross-linking co-agents remain after the molding and the curing to enhance further cross-linking during step (b).

18. A method of sealing between a rotating and a static component of a subterranean drilling tool, comprising:
    (a) molding an annular member from an elastomeric material of generally uniform composition and cross-linking the elastomeric material to create at least one property having a selected first level that is generally uniform throughout the annular member; and
    (b) exposing at least a portion of the exterior surface of the member to radiation source to form a property gradient to a selected depth within the annular member, wherein the property progressively changes from a second level at the surface to the first level without essentially changing the composition of the elastomeric material or changing the first level of the property within a core portion of the member; then
    forming a seal gland between the rotating and static components of the tool; and
    placing the annular member within the seal gland.

* * * * *

UNITED STATES PATENT AND TRADEMARK OFFICE
CERTIFICATE OF CORRECTION

PATENT NO. : 7,168,147 B2 Page 1 of 1
APPLICATION NO. : 11/177388
DATED : January 30, 2007
INVENTOR(S) : Redd H. Smith et al.

It is certified that error appears in the above-identified patent and that said Letters Patent is hereby corrected as shown below:

Column 1, line 48, delete "a" before "chlorinated"

<u>In the Claims:</u>

Column 6, line 56, insert --a-- before "radiation"

Signed and Sealed this

Twenty-ninth Day of May, 2007

JON W. DUDAS
*Director of the United States Patent and Trademark Office*